Oct. 7, 1924.  
H. C. WEISSE ET AL  
CUTTING DEVICE  
Filed Aug. 19, 1921  
1,511,191  
2 Sheets-Sheet 1
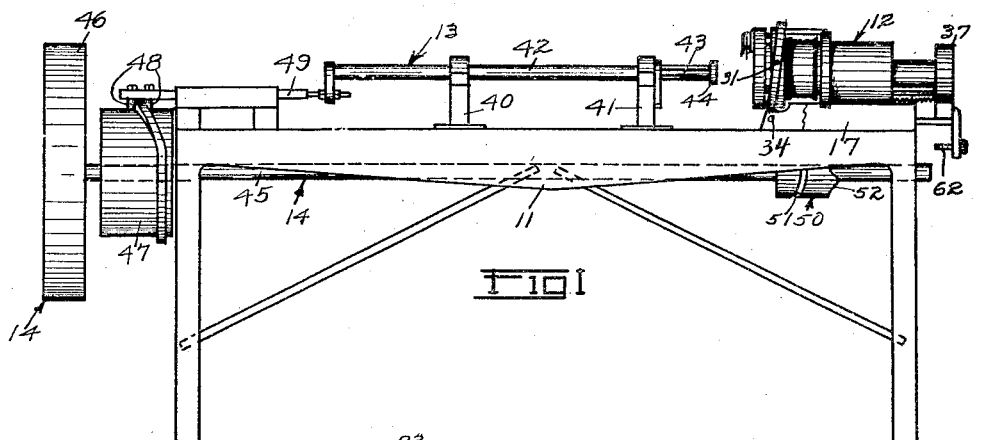
FIG 1
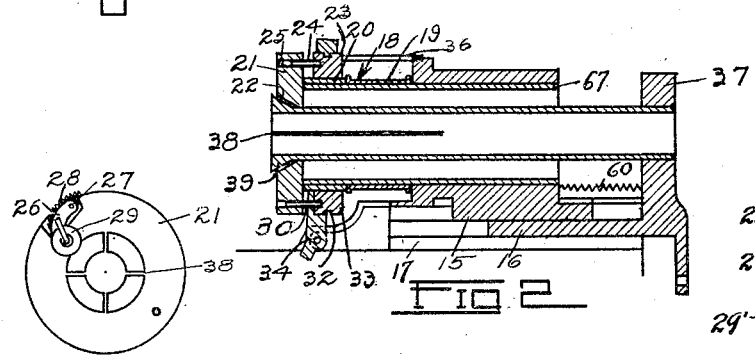
FIG 2  FIG 3  FIG. 3-B.
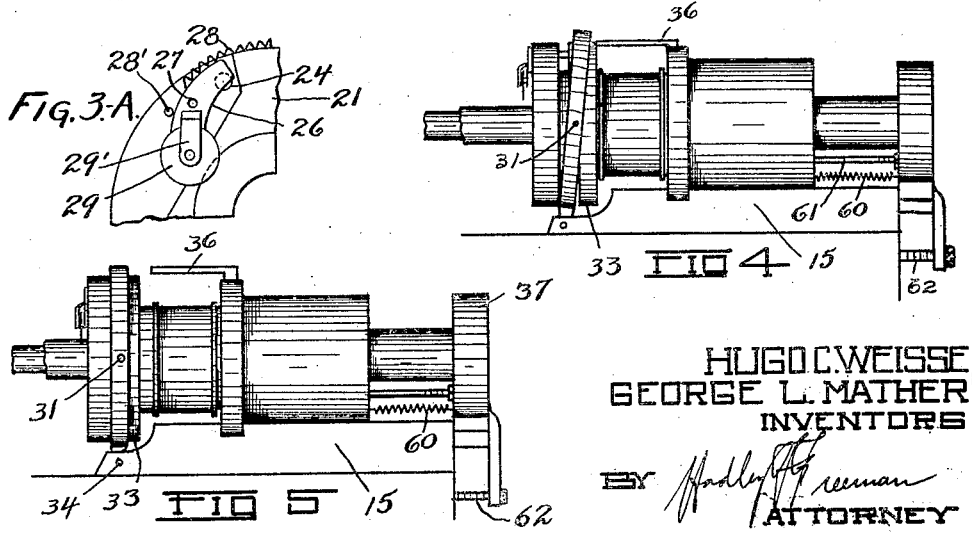
FIG. 3-A.  FIG 4  FIG 5
HUGO C. WEISSE  
GEORGE L. MATHER  
INVENTORS  
BY Hadley Freeman  
ATTORNEY

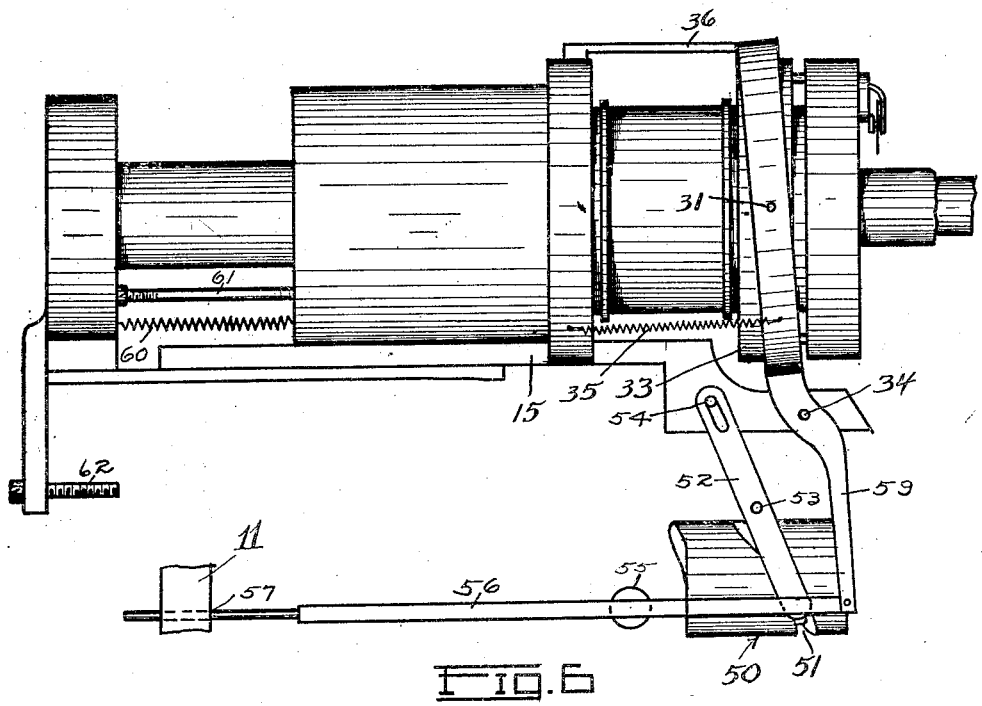

Patented Oct. 7, 1924.

1,511,101

UNITED STATES PATENT OFFICE.

HUGO C. WEISSE AND GEORGE L. MATHER, OF MILWAUKEE, WISCONSIN, ASSIGNORS, BY MESNE ASSIGNMENTS, TO THE FISK RUBBER COMPANY, OF CHICOPEE FALLS, MASSACHUSETTS, A CORPORATION OF MASSACHUSETTS.

CUTTING DEVICE.

Application filed August 19, 1921. Serial No. 493,753.

*To all whom it may concern:*

Be it known that we, HUGO C. WEISSE and GEORGE L. MATHER, citizens of the United States, and residents of Milwaukee, in the county of Milwaukee and State of Wisconsin, have invented certain new and useful Improvements in Cutting Devices, of which the following is a specification.

Our invention relates to hose cutting devices and has as its object to provide a useful combination of devices for cutting hose of indefinite length into pieces of definite length. For example radiator hose made in long lengths may be conveniently cut for use. The invention is illustrated in the accompanying drawings. In these drawings:—

Figure 1 represents a side view of this illustrative embodiment,

Fig. 2 is a vertical section of the cutting head shown in Fig. 1,

Fig. 3 is a front view of a rotatable disk on the cutting head and Figs. 3ᴬ and 3ᴮ are detail views showing in detail the mounting of the cutting disk and part of its controlling mechanism, Fig. 4 is a view of the cutting head in the position of the parts when the hose is clamped and supported ready for the cutting operation, Fig. 5 is a view of the cutting head in cutting position, while Fig. 6 is a reverse side view of the cutting head and its operating mechanism, certain portions of the frame being broken away.

The machine herein described comprises a frame 11 carrying cutting head 12, positioning mechanism 13, and driving mechanism 14. The cutting head 12 comprises a pair of slides 15 and 16 each mounted in guideways in a block 17 secured to the table frame 11. The slide 15 carries a bearing tube 67 on which rotates a unit 18 comprising a pulley 19, an intermediate section 20, and a disc 21. The disc 21 is provided with a central opening having a beveled or outwardly flaring mouth. The intermediate section 20 of the bearing tube carries a ring 23 which is slidably mounted thereon and carries a pin 24 which extends through an aperture 25 in the disc 21. The pin 24 is provided with a beveled end adapted to engage the beveled surface of a knife carrier 26 which is pivoted to the disc 21 at 27.

The knife carrier is spring pressed against the pin 28' by a spring 28, and carries a cutting disc 29. The ring 23 is rotated by the disc 21 by means of the pin 24 and a second similar pin 30 and is controlled in its longitudinal movement on unit 18 by a pair of pins 31 (see Fig. 4) riding in a groove 32 of the ring 23 and carried by a yoke 33 which is pivoted at 34 to the slide 15. The yoke 33 is spring pressed by the spring 35, and is limited in its movement by a stop 36 carried by the slide 15. The slide 16 carries a tube or hose guide 37 adapted to receive the hose which is to be cut. The guide 37 is split at its free end as shown at 38 at four equidistant points (see Fig. 3), and provided at this free end with an enlargement or a beveled annulus 39 adapted to cooperate with the mouth 22 of the disc 21 in a manner to clamp the hose for the cutting operation as will be described.

The table 11 carries end bearing 40 and 41 adapted to support a reciprocable rod 42 which carries at its forward end a finger 43 positioned in alignment with the aperture of the hose guide 37, of such size as to snugly fit the interior of the hose at the point at which the hose is to be severed, and surrounded by a collar 44 supported by the bearing 41 and adjustable longitudinally of the finger in any suitable manner.

The unit 18 is rotated by means of a belt (driven from any suitable shaft not shown) engaging the pulley 19. The remaining mechanism is operated by means of the operating mechanism 14 which comprises a shaft 45 operated by a belt driven pulley 46 and carrying a drum cam 47 adapted to engage rollers 48 carried by a bar 49 (suitably mounted as indicated for longitudinal movement in the frame) connected to the reciprocating rod 42. The main drive shaft 45 also carries a double cam 50 consisting of a groove cam 51 and a face cam 52. This groove cam 51 is engaged by a pin on a lever 52' which is pivoted centrally at 53 to the frame 11 and at its other extremity is connected by a pivot 54 to the slide 15 (Fig. 6 indicates the arrangement). The face cam 52 is adapted to engage a roller 55 (see Fig. 6 where the cam barrel 50 is cut away to more clearly show the roll 55) carried by a slide 56 resting at one end in an aperture 57 in the frame 11 and pivoted at the other end to the extension 59 of the yoke 33. The slide 15 is connected to the slide 16 by means of the tension spring 60 and the slide 15 also carries a stud 61 adapted to engage the slide 16 while the slide 16 carries a stud 62 adapted to engage the main frame 11.

In operation a hose (for example one made of rubber and fabric) is fed by hand through the hose guide or chuck shown in section in Fig. 2. The end of the hose is pushed forwardly until it abuts the stop 44 (Fig. 1). From the position of the parts in Fig. 1 cam 47 moves rod 42 to the right whereby the finger or core 43 enters the bore of the hose and bridges the space between the chuck and stop 44. The hose is thereby supported for the cutting operation.

The cam 50 rocks lever 52' on its pivot 53 to bring slide 15 (connected by pin 54 to lever 52') forwardly toward the abutment 44. The slide frame 16 through its connection by coiled spring 60 is moved along with 15 until the stop 62 strikes the frame 11, when 16 must stop. But slide 15 continues its movement until the cooperating beveled mouth 22 and annular head 39 (Fig. 2) engage. This engagement is between rotating and non-rotating surfaces so that suitable lubricated and wearing surfaces are provided. The axial movement causes the slotted chuck head to contract and squeeze the hose tightly. The hose is thereby clamped for the cutting operation.

With the hose both supported and clamped by the non-rotating parts mentioned the rotatable cutting mechanism is brought into operation.

The unit 19 as a whole is rotated by a belt on the pulley 19 already mentioned. The disk 21 is fixed to unit 19 but the ring 23 is slidable on the unit between the pulley and the disk 21 to a degree determined by stop 36. The ring 23 is driven with 22 by pins 24 and 30. The yoke 33 is moved by cam face 52 (Fig. 1) through the linkage 56 and 59 (see Fig. 6 in which the roll 55 is shown but with the cam on barrel 50 cut away), so that disk 23 is moved toward disk 21. By this movement the finger 24 is pushed through disk 21 until its beveled end engages the outer end of lever 26. This lever as shown in Fig. 3^A is pivoted centrally at 27 on disk 21 and carries a yoke 29' with the circular knife 29 rotatably mounted therein. Further movement of pin 24 rocks 26 on its pivot so as to move knife 29 into contact with the hose to be cut. As already described the disk 21 is rotated with the unit 19 so that knife 29 is moved around the hose to completely sever it. Thus the hose between the abutment 44 and the knife is severed.

On continued rotation of the power shafts, the parts are brought back to the position of Fig. 1 and spring 28 moves the knife holder back to contact with stop 28'. As the finger 43 is returned the predetermined length of severed hose is stripped by the head 44 holding the end of the hose in place as the finger retracts. The cut piece then falls clear of its own weight. The operator again feeds the remaining hose through the bore of the chuck and the operations are repeated.

We claim:

1. A hose cutter having in combination a hollow chuck through which the hose is fed, an abutment spaced from the chuck and in alignment therewith, a supporting finger movable to bridge the space between the abutment and chuck, a rotatable knife mounted adjacent the chuck and mechanism to automatically operate the chuck to clamp the hose on its supporting finger and rotate said knife to sever the hose.

2. In a hose cutter a rotatable cutting head, a clamp centrally located in said head, an abutment axially spaced from said clamp, a supporting finger axially movable to and from a position between said clamp and abutment, said clamp having a central opening to receive hose, and mechanism to intermittently clamp the hose when the supporting finger is in said position and rotate said head to sever the hose between the abutment and clamp.

In testimony whereof we have signed our names to the above specification.

GEORGE L. MATHER.
HUGO C. WEISSE.